United States Patent
Gustavsson et al.

(10) Patent No.: US 7,676,345 B2
(45) Date of Patent: Mar. 9, 2010

(54) METHOD AND SYSTEM OF DETERMINING THE ABSOLUTE VELOCITY OF A VEHICLE

(75) Inventors: Fredrik Gustavsson, Linköping (SE); Jonas Nilsson, Linköping (SE); Tony Gustavsson, Mölndal (SE)

(73) Assignee: NIRA Dynamics AB, Linkoping (SE)

( * ) Notice: Subject to any disclaimer, the term of this patent is extended or adjusted under 35 U.S.C. 154(b) by 0 days.

(21) Appl. No.: 10/563,531

(22) PCT Filed: Jul. 7, 2003

(86) PCT No.: PCT/EP03/07282

§ 371 (c)(1),
(2), (4) Date: May 12, 2006

(87) PCT Pub. No.: WO2005/005993

PCT Pub. Date: Jan. 20, 2005

(65) Prior Publication Data

US 2006/0241892 A1 Oct. 26, 2006

(51) Int. Cl.
*G06F 17/40* (2006.01)
*G06F 17/00* (2006.01)

(52) U.S. Cl. .................... 702/142; 702/96; 702/147; 702/148; 701/75

(58) Field of Classification Search .............. 702/142, 702/147, 96
See application file for complete search history.

(56) References Cited

U.S. PATENT DOCUMENTS

| | | | |
|---|---|---|---|
| 5,301,130 A | 4/1994 | Alcone et al. | |
| 5,557,552 A * | 9/1996 | Naito et al. | 702/148 |
| 5,825,117 A | 10/1998 | Ossmann et al. | |
| 6,264,292 B1 * | 7/2001 | Umeno et al. | 303/196 |
| 6,354,675 B1 * | 3/2002 | Miyazaki | 303/150 |
| 6,789,038 B2 * | 9/2004 | Nakashima et al. | 702/142 |
| 2006/0015288 A1 * | 1/2006 | Ai et al. | 702/142 |

FOREIGN PATENT DOCUMENTS

| | | |
|---|---|---|
| DE | 27 51 012 A1 | 5/1979 |
| DE | 28 49 028 A1 | 5/1980 |
| DE | 34 35 866 A1 | 4/1986 |
| DE | 43 28 442 A1 | 3/1995 |
| EP | 0 294 803 A2 | 12/1988 |
| EP | 1 014 092 A2 | 6/2000 |
| EP | 1 274 613 A1 | 1/2003 |
| WO | WO0176925 A1 * | 10/2001 |
| WO | WO2004067307 A1 * | 8/2004 |

* cited by examiner

*Primary Examiner*—Hal D Wachsman
(74) *Attorney, Agent, or Firm*—Frost Brown Todd LLC; William Morriss (57) ABSTRACT

A method of determining the velocity (v) of a vehicle is provided. The vehicle has at least one pair of a front and a rear wheel which are spaced by a wheel spacing (B). Front and rear wheel speed signals (ω) are determined which are indicative of the time dependent behavior of the front and rear wheel speeds, respectively. The front and rear wheel speed signals (ω) are correlated in order to determine a specific correlation feature indicative of the time delay (τ) between the front wheel and rear wheel speed signals. The velocity (v) of the vehicle is determined based on the correlation feature and the wheel spacing (B).

17 Claims, 7 Drawing Sheets

METHOD AND SYSTEM OF DETERMINING THE ABSOLUTE VELOCITY OF A VEHICLE

CROSS REFERENCE TO RELATED APPLICATIONS

This application hereby claims the benefit of, and is the national stage commencement under 35 U.S.C. §371 of, PCT application PCT/EP2003/007282, filed on Jul. 7, 2003.

FIELD OF THE INVENTION

The present invention relates generally to a method of, a system for and a computer program product for determining the velocity of a wheeled vehicle.

BACKGROUND OF THE INVENTION

Knowledge of a vehicle's speed is fundamental to the driver, but also for many modern control systems as anti-lock braking systems (ABS), dynamic stability systems, anti-spin systems and traction control systems. Also, recent approaches to driver safety information systems, as road friction indicators and sensor-free tire pressure monitoring systems require precise velocity information.

There are no standard sensors in commercial cars that can measure absolute velocity. The speedometer of wheeled vehicles is based on the formula $v=\omega_{nom}$ [m/s], where $\omega$ is the wheel rotational speed and $r_{nom}$ is the nominal wheel radius. The rotational speed of a wheel is accurately measured by on-board sensors, as available for example in the antilock braking system (ABS). Wheel radii, however, may change with temperature, wear and even with the velocity to be measured due to centripetal forces which makes it impossible to exactly determine the wheel radius. Thus, in practice only a nominal approximate value can be used which leads to up to 10% error in the velocity measurement. This may be acceptable for the driver, who can tolerate such an error, but both the driver and the control and information systems listed above benefit from increased precision of the velocity measurement.

Prior art describes different principles to measure the absolute velocity of a vehicle:

In image correlation techniques, a camera provides an image of an area of the road surface beneath the vehicle, and by taking a new one which partly covers the same road surface area, image correlation provides an absolute velocity. While being very accurate and insensitive to wheel grip and surface, its drawback is its cost and sensitivity to dirt and damages.

Navigation using GPS and digital street maps enables information of the driven path from which the absolute velocity can be computed. The price is still high, and there is no integrity guarantee for such systems when used in safety critical applications.

Fix point reference based approaches, either requiring an on-board vision system or markers in or along the road and corresponding sensors in the car.

Using a well calibrated extra free-rolling wheel. Though being used by road authorities, it is hardly a mass market solution.

Sensor fusion of longitudinal accelerometer signal and wheel rotational speed, as disclosed in EP 1 274 613 A1. This approach promises accurate estimation of absolute wheel radius, and thus vehicle velocity, but requires a non-standard though cheap sensor.

Another approach is based on measuring vehicle vibrations both at the front axle and at the rear axle of the car. The front axle and the rear axle feel road bumpiness in a time delayed manner. From the time difference between vibrations at the front axle and at the rear axle and the axle distance, the velocity of the vehicle can in principle be determined. In prior art, there are several implementations which are based on this approach.

The German patent application DE 34 35 866 A1 discloses a system which uses the correlation of wheel suspension signals to determine a vehicle velocity. The suspension sensors measure up-down movement of the front and the rear axles to determine the velocity. The European patent application EP 1 014 092 A2 describes a similar system based on the same type of sensors. A main drawback of these systems is that few vehicles are today equipped with the necessary sensors.

The European patent publication EP 0 294 803 A2 discloses a system based on force sensors in a spring leg. These sensors are spaced in the driving direction, and the absolute velocity is computed by correlation analysis as above.

The system disclosed in US patent publication U.S. Pat. No. 5,301,130 is based on correlation analysis of data obtained by vertical acceleration sensors.

Another type of system which is based on correlation analysis is disclosed in the German patent applications DE 27 51 012 A2 and DE 28 49 028 A2. The systems described therein use transducers for generating electrical signals reflecting the road surface unevenness.

All these known systems have at least two of the following drawbacks:

Most approaches require dedicated (costly) sensors.

Correlation based approaches uses Fast Fourier Transform (FFT) algorithms which are memory and computational intensive.

Standard approaches to correlation analysis described in prior art using either time-domain or frequency domain (FFT) inevitably require that the velocity must be constant during each batch, which is hardly true in practice. Even small velocity variations imply that accuracy is lost.

Furthermore, none of the above presented correlation techniques disclose a solution for the problem of varying vehicle velocities. Indicative of the vehicle velocity is the maximum peak of a correlation function whose position depends on the time delay between rear axle vibrations and front axle vibrations. Since the position of the correlation peak shifts with varying velocity, a smeared correlation peak is obtained from a data sample which was recorded with varying vehicle velocity. This peak shift deteriorates velocity measurements. But particularly in situations with varying velocity (breaking, acceleration, cornering, etc.) accurate vehicle velocity information is required by safety control systems.

SUMMARY OF THE INVENTION

A first aspect of the invention is directed to a method of determining the velocity of a vehicle having at least one pair of a front and a rear wheel which are spaced by a wheel spacing. For at least one pair of wheels, the method comprises determining front and rear wheel speed signals indicative of the time dependent behavior of the front and rear wheel speeds, respectively. The method further comprises correlating the front and rear wheel speed signals in order to determine a specific correlation feature indicative of the time delay between the front wheel and rear wheel speed signals. Finally, the method comprises determining the velocity of the vehicle based on said correlation feature and the wheel spacing.

Another aspect of the invention is directed to a system for determining the velocity of a vehicle having at least one pair of a front and a rear wheel which are spaced by a wheel spacing. The system comprises wheel speed sensors arranged to provide front and rear wheel speed signals indicative of the time dependent behavior of the front and rear wheel speeds, respectively. The system further comprises a correlation unit arranged to correlate the front and rear wheel speed signals in order to determine a specific correlation feature indicative of the time delay between the front wheel and rear wheel speed signals; and to determine the velocity of the vehicle based on the wheel spacing and the correlation feature thus determined.

Yet another aspect of the invention is directed to a computer program product including program code for carrying out a method, when executed on a processing system, of determining the velocity of a vehicle having at least one pair of a front and a rear wheel which are spaced by a wheel spacing. The program code is arranged to determine front and rear wheel speed signals indicative of the time dependent behavior of the front and rear wheel speeds, respectively. The program code is further arranged to correlate the front and rear wheel speed signals in order to determine a specific correlation feature indicative of the time delay between the front wheel and rear wheel speed signals. The program code is finally arranged to determine the velocity of the vehicle based on said correlation feature and the wheel spacing.

Other features are inherent in the methods and systems disclosed or will become apparent to those skilled in the art from the following detailed description of embodiments and its accompanying drawings.

DESCRIPTION OF THE DRAWINGS

FIGS. 4a-4d show the coherence function of the signals in FIG. 3 which is indicative of the frequency spectrum of the signals; FIG. 4a corresponds to the front-left wheel; FIG. 4b to the front-right wheel; FIG. 4c to the rear-left wheel; and FIG. 4d to the rear-right wheel;

FIGS. 6a-6b show the coherence function of the signals in FIG. 3 indicative of the correlation at each frequency; FIG. 6a correlates front-left and rear-left wheels; FIG. 6b correlates front-right and rear-right wheels.

FIG. 8 shows the absolute value (upper plot) (FIG. 8a) and the phase value (lower plot) (FIG. 8b) of the ratio of the Fourier transformed wheel speed signals of FIGS. 8a-8b show the absolute value (upper plot) (FIG. 8a) and the phase value (lower plot) (FIG. 8b) of the ratio of the Fourier transformed wheel speed signals of the Fourier transformed wheel speed signals of the front-left and rear-left wheels. A straight line is fitted to the curve in the lower plot whose slope is a measure for the time delay in the corresponding wheel speed signals;

DESCRIPTION OF THE PREFERRED EMBODIMENTS

In general the presented method and system for determining the velocity of a vehicle is based on a correlation analysis of the time dependent behavior of wheel speed signals of a vehicle's front and rear wheels which varies with road bumpiness or unevenness. The cause for such variations may be any small or large road feature like asphalt texture, split, small stones, bumps, etc. These features induce these variations via the tire-road contact. The variations which are induced at a particular wheel result in a specific time dependent behavior of the respective wheel speed signal. The wheel speed signals are measured in a pair of a front and a rear wheel which are running in a lane so that they feel the same road features in a time delayed manner. Wheel speed sensors measure the front and rear wheel speed signals. The instantaneous wheel speed signals are influenced by the road features which were instantaneously passed by an individual wheel. A correlation analysis of the front and the left wheel speed signals shows specific correlation features, like a maximum in the correlation function, which are indicative of the time delay between the front wheel and rear wheel speed signals. From this time delay and the spacing between the front wheel and the rear wheel of the vehicle, it is possible to determine the velocity of the vehicle. Some aspects of this method are now described in more detail.

The vehicle may be any wheeled vehicle, like cars, lorries, trucks, motorcycles, trains, etc. which have a front and a rear wheel in contact with ground. In the following embodiments, the two wheels which are running in a lane (a front wheel and a rear wheel) are referred to as belonging to a particular pair of wheels. In general, the front and the rear wheel are mounted on different axles but the axles are not required to be the first and the last axle of the vehicle. For example, the front-left and the rear-left wheel of a four wheeled car may constitute an appropriate wheel pair. In vehicles with more then two axles, two arbitrary axles of the entire set of axles may be chosen as the two wheels in a lane which are here denoted as front and rear wheel. The front and the rear wheel should preferably run in a lane so that during straight driving road features which are passed by the front wheel are subsequently passed by the rear wheel. Of course, slight displacements of the front and rear wheels with reference to each other are tolerable. Wheel speed variations at the two wheels of such a pair of wheels are the basis for the velocity determination as presented herein. More then one of the above defined wheel pairs may be included in a velocity analysis to enhance the performance of the system, but, in the following embodiments, the principles of the velocity determination method are presented with one pair of wheels only.

The two axles respectively the two wheels are spaced by a distance which is in the following denoted as wheel spacing. The wheel spacing is referred to as parameter B in the figures and formulas.

Figure 1:
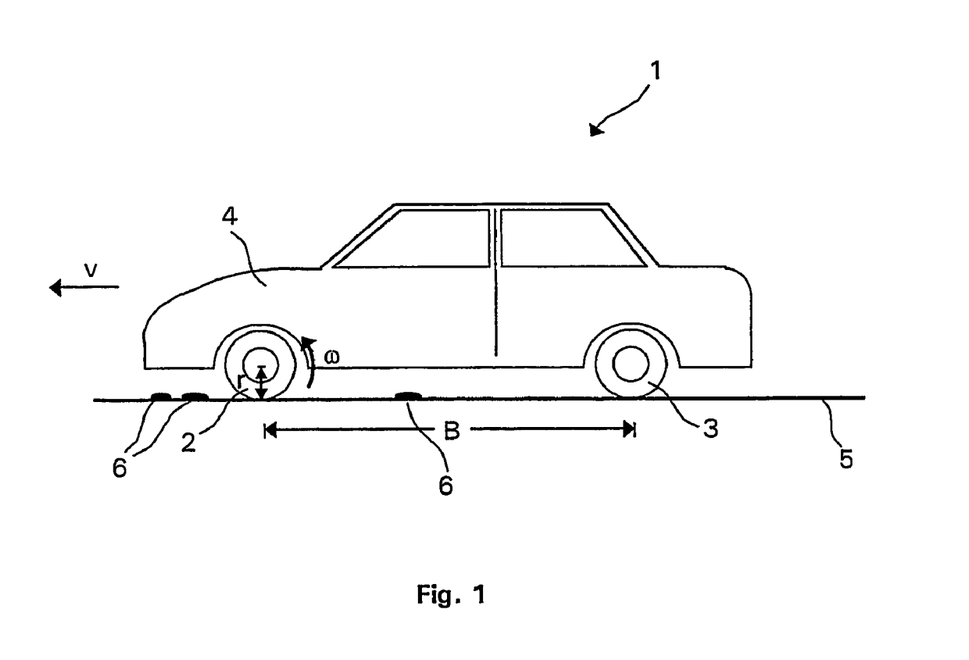
FIG. 1 shows a four-wheeled car driving on a road with surface unevenness.

FIG. 1 shows an embodiment which illustrates the environment in which the method as presented above is implemented. A car 1 having a car body 4 is driving on a road 5 in forward direction v. Due to the forward motion of the car 1, the front wheels 2 and the back wheels 3 are rotating counterclock wise. The current rotational speed of the front tire 2 is denoted as ω and the current front wheel radius as r. Via the tire-road contact wheel speed variations are induced by road bumps 6. The distance between the front and rear axle is denoted as B.

Figure 10:
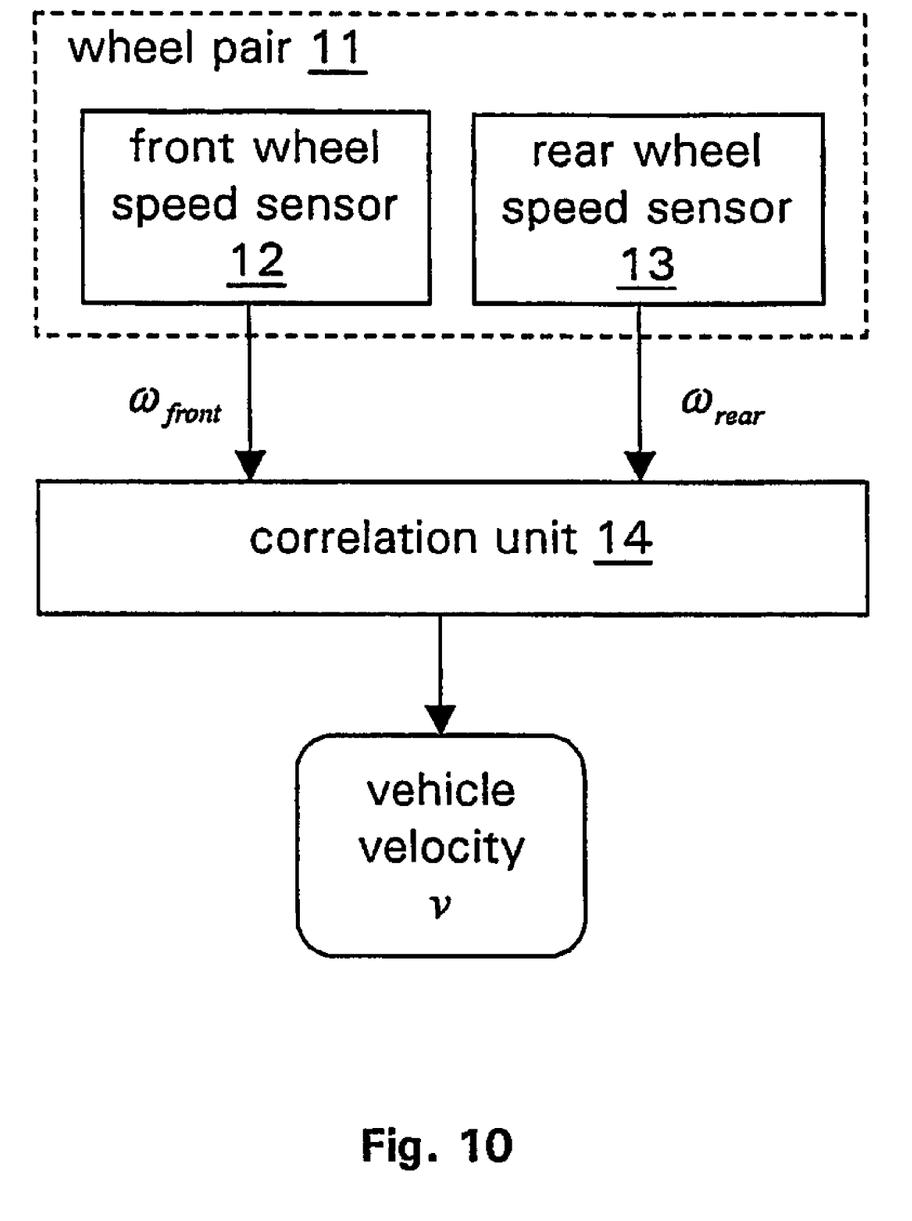
FIG. 10 shows a schematic block diagram of the system for determining the velocity of a vehicle.

FIG. 10 shows a schematic block diagram of the system for determining the velocity of a vehicle. A front wheel speed sensor 12 and a rear wheel speed sensor 13 associated with a pair of wheels 11 provide a front wheel speed signal $\omega_{front}$ and a rear wheel speed signal $\omega_{rear}$, respectively, to a correlation unit 14. In the correlation unit 14, the front wheel speed signal $\omega_{front}$ and the rear wheel speed signal $\omega_{rear}$ are correlated to obtain the vehicle velocity v.

Figure 11:
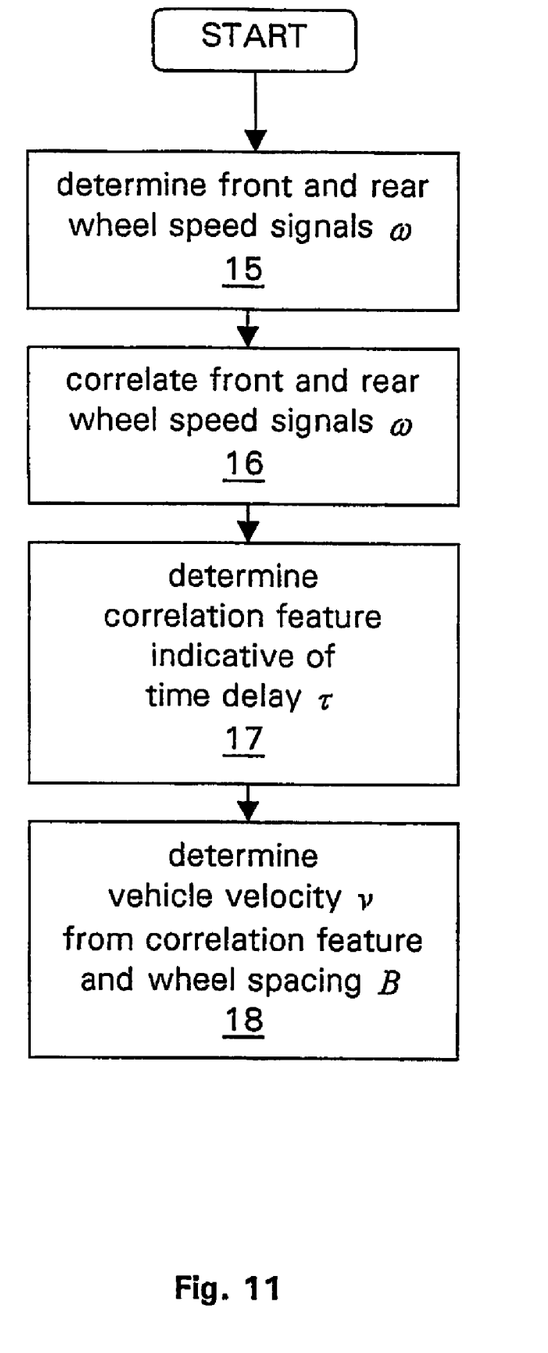
FIG. 11 shows a block diagram of the method scheme of determining the velocity of a vehicle.

FIG. 11 shows a block diagram of the method scheme of determining the velocity of a vehicle. The method scheme starts at the block which is denoted by 'START'. In a next block 15, front and rear wheel speed signals are obtained from front and rear wheel speed sensors. In a subsequent block 16, these front and rear wheel speed signals are correlated with each other. In a next block 17, a specific correlation feature indicative of a time delay $\tau$ is identified in the correlation result. In a final block 18, the vehicle velocity v is obtained from the thus obtained time delay $\tau$ and the known wheel spacing B of the pair of wheels.

Wheel Speed Sensors

The sensor which provides the wheel speed signal may be any common wheel speed sensor. Preferably, the wheel speed sensors of an antilocking system (ABS) are used in the embodiments since such ABS-sensors are already mounted in a majority of the vehicles today. Wheel speed sensors are well known to the person skilled in the art. They typically comprise a toothed wheel, a slotted disk or any otherwise featured disk which is rotating in synchronism with a vehicle wheel. A sensor is arranged to generate a signal each time a feature of the disk enters or leaves its range of observation. The sensor may be an optical sensor, a magnetic sensor (e.g. a HALL-sensor) or any other contemptible type of sensor. The sensor produces electrical signals which are transported by wires or radio transmission to a subsequent unit for further processing.

Figure 2:
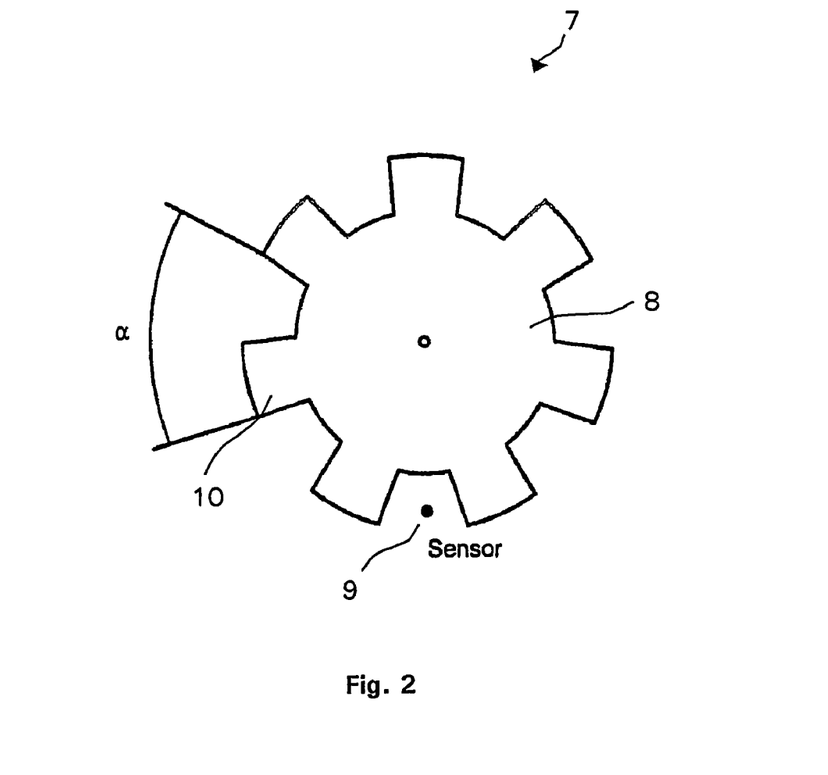
FIG. 2 is a schematic view of an embodiment of a wheel speed sensor.

FIG. 2 shows a schematic view of an embodiment of a wheel speed sensor. The wheel speed sensor 7 comprises a toothed wheel 8. The toothed wheel has L teeth 10 which are equidistantly spaced over the circumference of the wheel. In the embodiment as shown, there are L=7 teeth which are spaced by gaps of the same dimensions as the teeth. Thereby, the circumference is separated in L identical sections which all cover the same angle $\alpha=2\pi/L$. A sensor 9 is arranged to observe passing teeth. The sensor generates a high level signal when covered by a tooth and a low signal when not. Thus it generates a periodic pulse train having a periodicity which depends on the rotational speed of the rotating disk. Preferably, a signal is generated at each flank of the pulse train indicating an advance of the wheel by an angle of $\alpha=2\pi/L$.

Embodiment of a Signal Model

In this section, the principles of the velocity measurement are explained with reference to a continuous time wheel angular speed signal $\omega(t)$. With 'continuous time' signal a real or hypothetical signal is denoted which provides a data point for every time instance in the available time interval. Some sensors, however, provide sampled measurement signals which are not continuous time signals but discrete signals since, for example, in digital measurements only a limited number of measurement values is recorded. A discussion of an implementation of the velocity measurement in connection with discrete signals will be provided further below.

Figure 3:
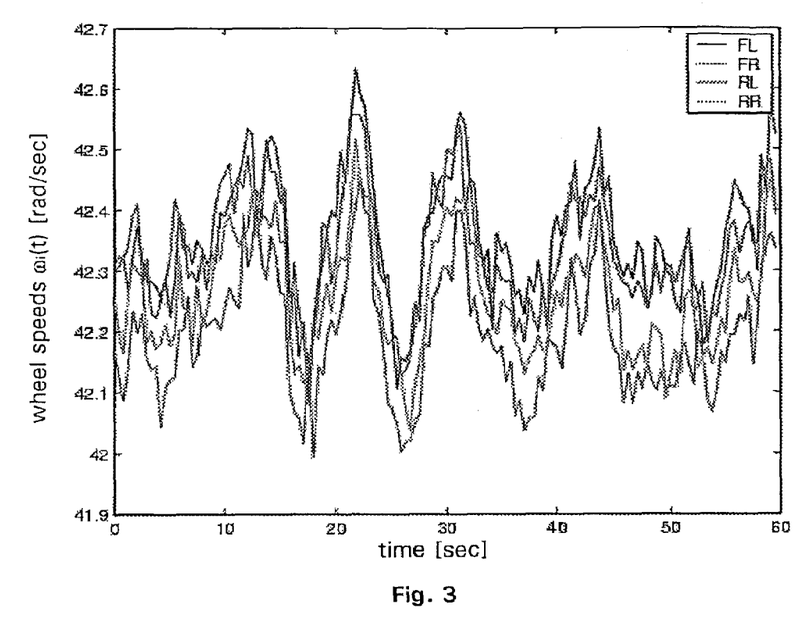
FIG. 3 shows two typical wheel speed signals which were re-sampled to the time domain.
Figure 4A:
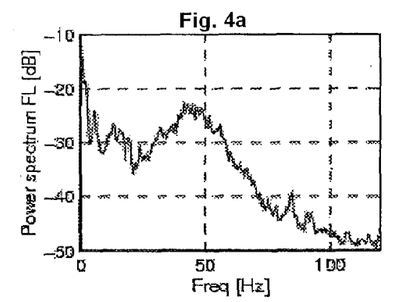
Figure 4B:
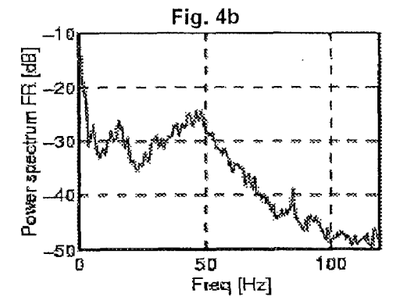
Figure 4C:
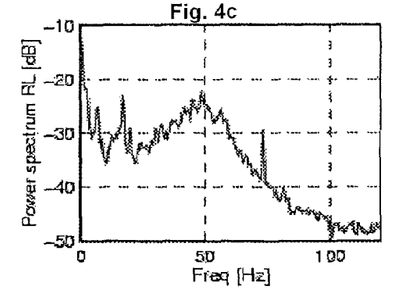
Figure 4D:
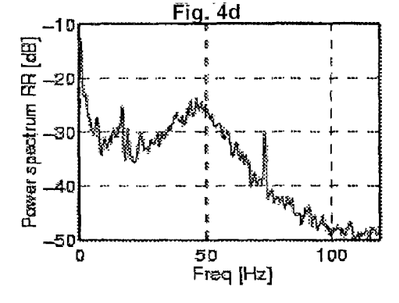

Let $\omega_i(t)$ denote the velocity of each wheel i=1, 2, ... of a vehicle. The embodiment which is shown in FIG. 1 applies to a four-wheeled car where the front-left wheel is numbered 1, the front-right 2, the rear-left 3 and the rear-right 4. Examples of wheel speed signals are shown in FIG. 3. The plot shows measured wheel speeds in rad/s of the four wheels of a car as function of time. The data was recorded over a time interval of 60 seconds. The wheel speeds are shown in the interval from 41.9 rad/s to 42.7 rad/s which illustrates that the fluctuations of the wheel speeds around their median are in the range of some percent. 40 rad/s corresponds roughly to 40 km/s which is about 11 m/s. Plotted are four curves corresponding to the four wheels FL=front-left, FR=front-right, RL=rear-left, RR=rear-right of the car. One curve contains an offset that is due to different tire radii, wheel slip or cornering. Both curves contain a barely visible disturbance that is delayed by 0.3 seconds.

The general principle applied in the embodiments is that the wheel speed signals contain a road induced disturbance which appears in the rear axle signals $\omega_1(t)$ and $\omega_2(t)$ $\tau$ seconds later than in the front axle signals $\omega_3(t)$ and $\omega_4(t)$. An embodiment for a signal model thus is $$\omega_1(t)=s(t)+d(t)+e_1(t) \quad (1)$$

$$\omega_3(t)=s(t)+d(t-\tau)+e_3(t) \quad (2)$$

where s(t) is the deterministic velocity component which stems from the velocity variations of the vehicle during driving and typically lies in the interval [0-5] Hz, d(t) is a road induced disturbance caused by road bumpiness which typically lies in the interval [30-60] Hz and $e_i(t)$ are all other kind of disturbances caused by wheel suspension, sensor errors and within the driveline. $e_i(t)$ may also contain small offsets caused by wheel slip on the driven wheels and road curvature (the front and rear wheels do not follow exactly the same path). This offset is clearly visible in FIG. 3.

Figure 7:
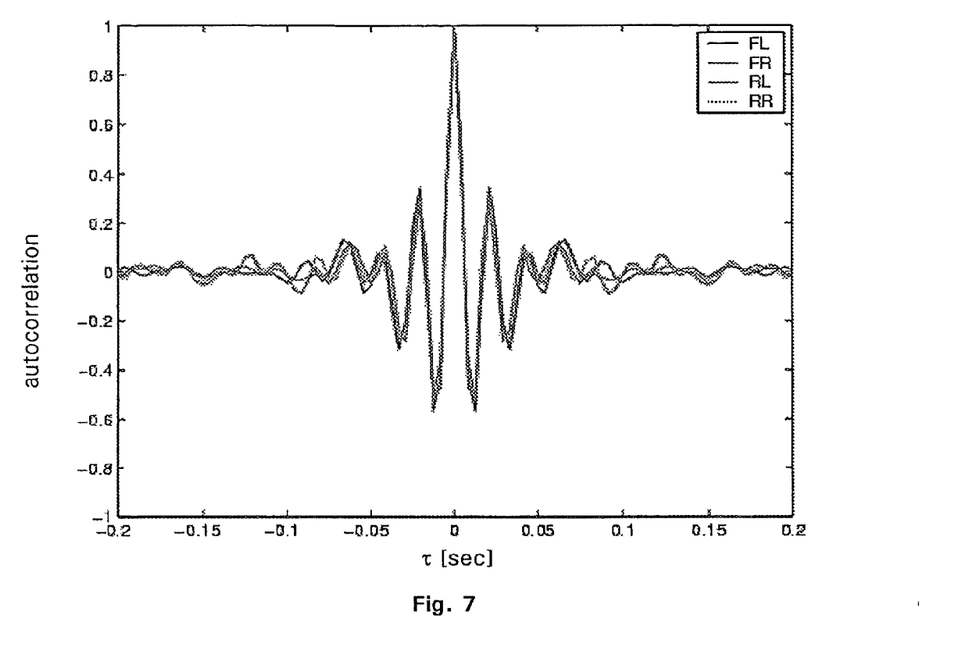
FIG. 7 shows the auto-correlation function of the signals in FIG. 3.

The spectra shown in FIG. 4 and the auto-correlation sequences shown in FIG. 7 are obtained after high-pass filtering the wheel speed signals to filter out s(t). The resemblance of the curves indicates that the common term d(t) dominates the noise term $e_i(t)$.

By determining the time delay $\tau$ between the disturbance component d(t) of the front and rear wheels the absolute velocity v of the vehicle can be calculated from the relation $\tau$=B/v where B is the spacing between the axles of the front and the rear wheel. In the embodiments as shown, this time delay $\tau$ is determined by a correlation analysis.

Velocity Determination Via Correlation Analysis

The cross correlation between the front and rear wheel speeds is defined as $$R_{13}(\tau)=E[(\omega_1(t)-E(\omega_1(t)))(\omega_3(t-\tau)-E(\omega_3(t-\tau)))]. \quad (3)$$

with $E(\omega(t))$ denoting the expectation value of $\omega(t)$. Small disturbances injected by uneven road surface will occur first on $\omega_1(t)$ and $B/\sigma_l$ seconds later on $\omega_3(t)$. Here $v_l$ denotes the velocity of the left side of the car. The cross correlation function is a function of time delay $\tau$ and will show a peak at $$\tau = \frac{B}{v_l} = \frac{B}{\omega_3 r_3} \quad (4)$$

When driving with constant speed, we can directly obtain $R_{13}(\tau)$. The plot of FIG. 4 shows the correlation function $R_{13}(\tau)$ of the wheel speed signals of the front-left and the rear-left wheel and the correlation function $R_{24}(\tau)$ of the wheel speed signals of the front-right and the rear-right wheel of a car. The abscissa of the plot represents the time delay $\tau$ in the interval from $-1$ to $1$ seconds. The ordinate denotes the corresponding values of the cross correlation function $R_{13}(\tau)$. Each correlation function shows a peak of maximal oscillation for a particular time delay value $\hat{\tau}$. These peaks indicate that disturbances in the wheel speed signals are most similar at these particular time delay values.

The time delay is obtained from $R_{13}(\tau)$ by $$\hat{\tau} = \underset{\tau}{\operatorname{argmax}}\ R_{13}(\tau) \qquad (5)$$

Inserting the obtained $\hat{\tau}$ in equation (4) then yields the absolute velocity of the left side of the car and the wheel radius of the rear-left. The above presented method however is only applicable when the vehicle is driving with constant velocity during the time interval in which the wheel speed signals which are inputted in equation (3) are recorded. A varying vehicle velocity would result in a smearing of the peak in the cross correlation function since the peak shifts with increasing velocity to the left and with decreasing velocity to the right.

Correlation Analysis for Varying Vehicle Velocity

In the following an embodiment is presented which remedies the problem of the shifting cross correlation peak at non-constant vehicle velocities. Since the correlation feature in equation (3) moves with velocity, a better approach is to study a velocity compensated correlation function. The idea here is to use the information about the vehicle velocity which is inherent in the wheel speeds. The wheel speed provides information about the current vehicle velocity when multiplied with the wheel radius, which however is an unknown scale factor. This information can be exploited to interchange the shifting of the correlation maximum with velocity by a shifting with the wheel radius. Using the relation $\tau=B/\omega_i r_i$ and defining $x=B/r_i$ in equation (3) gives the velocity compensated correlation function $$\overline{R}_{13}(x)=E(\omega_1(t)-E(\omega_1(t)))(\omega_3(t-x/\omega_1(t))-E(\omega_3(t-x/\omega_1(t)))). \qquad (6)$$

By maximizing $\overline{R}_{13}(x)$ with respect to the variable $x=B/r_1$ one can directly obtain an estimation value $\hat{r}_1$ for the wheel radius of the front-left wheel:

$$\hat{r}_1 = \underset{\tau}{\operatorname{argmax}}\ \overline{R}_{13}\left(\frac{B}{r}\right). \qquad (7)$$

Above, the correlation function was evaluated at $\tau=x/\omega_1(t)$ using the front-left wheel speed $\omega_1(t)$. The correlation function can analogously be obtained by evaluation at $\tau=x/\omega_3(t)$ using the rear-left wheel speed $\omega_3(t)$ with $x=B/r_3$ and $$\overline{R}_{31}(x)=E(\omega_1(t+x/\omega_3(t))-E(\omega_1(t+x/\omega_3(t))))(\omega_3(t)-E(\omega_3(t))) \qquad (8)$$

which gives $$\hat{r}_3 = \underset{\tau}{\operatorname{argmax}}\ \overline{R}_{31}\left(\frac{B}{r}\right). \qquad (9)$$

Proceeding with the right side of the vehicle in a similar way yields $\hat{r}_2$ and $\hat{r}_4$.

Since it is known that the wheel radius does not deviate very much from the nominal wheel radius $r_{nom}$ it is sufficient to estimate $\overline{R}_{13}(x)$ on a grid close around $B/r_{nom}$. The finer the computed grid is, the better is the potential accuracy in determining $\hat{r}_i$.

In summary, this embodiment allows to estimate all wheel radii $r_i$ of the vehicle even at rapidly varying vehicle velocities. From these wheel radii $r_i$, the absolute velocity $v_i=\omega_i r_i$ at each wheel can be determined and simple geometrical transformations can be used to find the velocity at any position of the vehicle.

Resolution Enhancement

The resolution in determining the position of the peak in the correlation function determines the resolution of the final wheel radius measurement respectively the velocity measurement. In reality, the functions $\omega_i(t)$ are not continuous time functions. Instead, they are discrete functions and their time resolution is mainly determined by the cog spacing of the cog-wheel in the ABS-sensor. Since a typical axle spacing of a car is $B=3$ m and a typical wheel radius is roughly $r=0.3$ m the peak of $\overline{R}_{13}(x)$ typically occurs for approximately $x=B/r_{nom}\approx 3/0.3=10$ which corresponds to approximately $BL/(2\pi)\approx 3\cdot 50/2=75$ cogs for an ABS sensor with a cog-wheel with $L=50$ cogs. In principle, the resolution which is obtainable when $r$ is determined is limited by this cog separation. Estimating for example 76 instead of 75 cogs for the correlation peak position results in an radius error of approximately 1.3%. In the following, embodiments are discussed which provide a finer resolution of the peak position determination. Another inherent problem is wheel slip on the driven wheels, which may introduce errors of about 1%. For two-wheel driven wheels, this can be avoided by only using free-rolling wheels.

In one embodiment, the wheel speed sensor signal is triggered both at positive and negative flanks of the toothed wheel. This doubles the precision compared to triggering only at positive flanks.

In another embodiment which is demonstrated later, non-integer interpolation is used when searching for the correlation peak.

Frequency Domain Analysis

In the following embodiment a frequency domain approach is presented for determining the time delay $\hat{\tau}$. It is well known to a person skilled in the art that a shift in the time domain corresponds to a phase change in the frequency domain. Fourier transforming the wheel speed signals $\omega_i(t)$ with standard FFT-methods results in corresponding Fourier coefficients $\Omega_i(f)$. A time shift of $\tau$ of the wheel speed signals in the time domain $\omega(t)\rightarrow\omega(t-\tau)$ corresponds to a phase shift $$\Omega(f)\rightarrow\Omega(f)e^{-i2\pi f\tau} \qquad (10)$$

in the frequency domain.

Figure 8A:
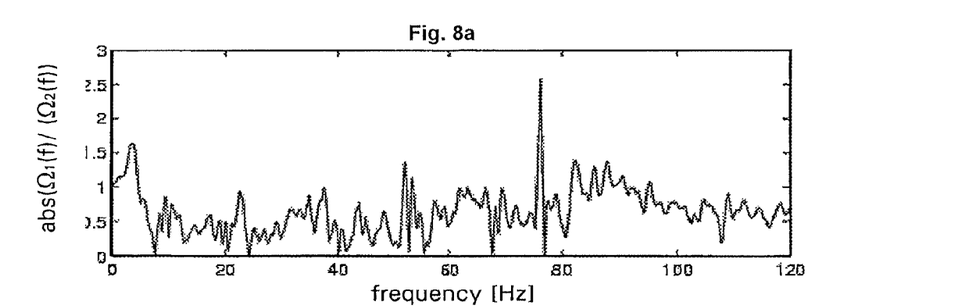
Figure 8B:
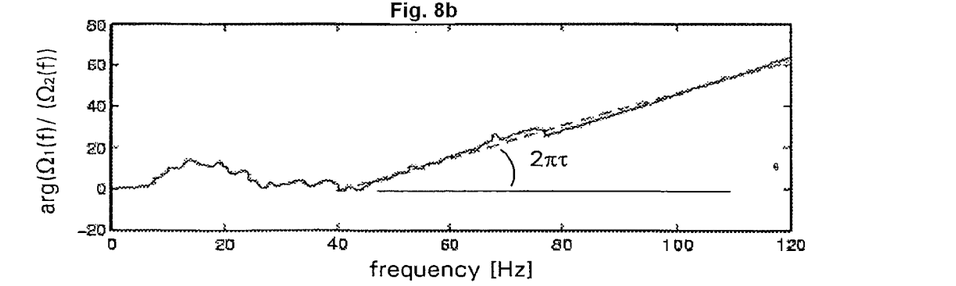
Figure 9:
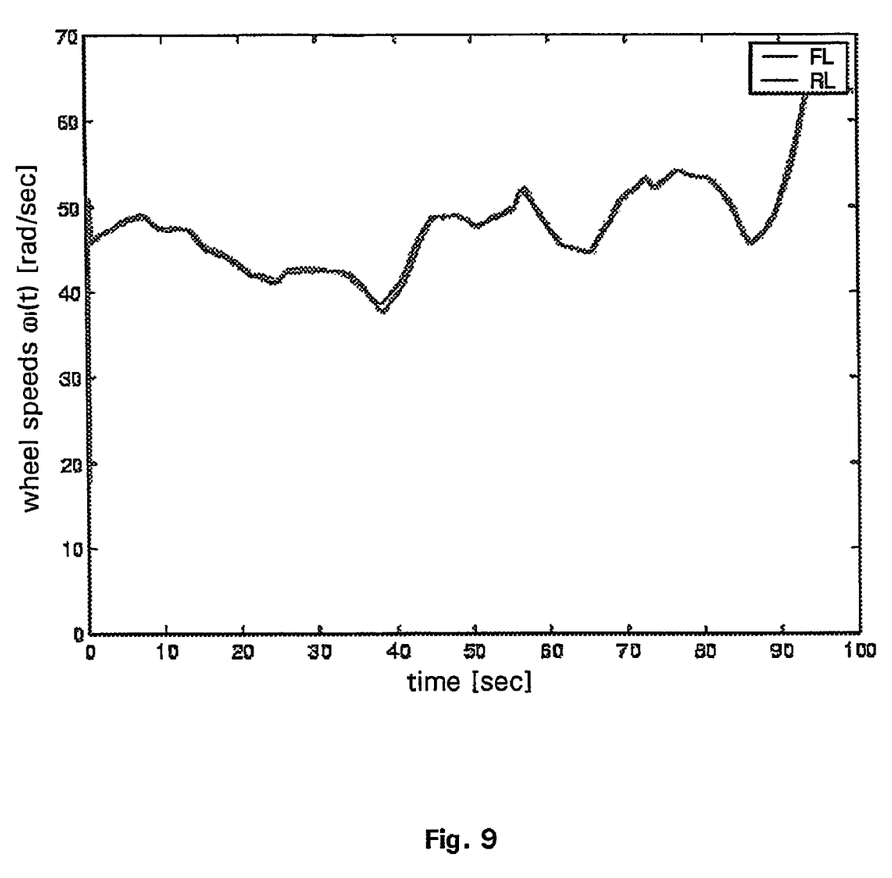
FIG. 9 shows, similarly to FIG. 3, two typical wheel speed signals which were re-sampled to the time domain, now with varying speed.

One approach is to adjust a straight line to the phase curve of $\Omega_1(f)/\Omega_3(f)$ which should according to equation (10) have a slope $2\pi\tau$. FIG. 8 shows an example which illustrates this procedure. The upper plot of FIG. 8 shows the absolute value $\operatorname{abs}(\Omega_1(f)/\Omega_3(f))$; and the lower plot shows the phase angle $\arg(\Omega_1(f)/\Omega_3(f))$ of the Fourier coefficient ratio of the front-left and rear-left wheel speeds. A straight line is fitted to the high frequency end of the curve. The slope of this specific curve yields a value of $\hat{\tau}=0.13$.

Another method to determine $\hat{\tau}$ in the Fourier domain is described in Knapp and Carter, "*The generalized correlation method for estimation of time delay*", IEEE Trans on Acoustics, Speech and Signal Processing, vol 24(4), pp. 320-326, 1976, the disclosure of which is herein incorporated by reference. This method is based on the formula $$\hat{\tau} = \underset{\tau}{\mathrm{argmax}} \int W(f)\Omega_1(f)\overline{\Omega}_3(f)df \qquad (11)$$

where $W(f)$ is a weighting function. This weighting function can be chosen such that the maximum likelihood estimate of time delay is obtained.

Time Domain and Angle Domain Signals

In digital signal processing it is very common that signals or data are sampled in the time domain. In this case, measurement values like signal values or signal changes are stored for subsequent points in time which are equidistantly spaced over the time axes. However, wheel speed sensors do not provide their data in a way which allows a direct storage in time domain. As described above, a wheel speed sensor triggers a signal each time the observed wheel has rotated by a particular angle ($\alpha=2\pi/L$ in the above embodiment). Consequently, the signal values (angles) are here equidistantly distributed over the signal axes, whereas the corresponding time instances are not equidistantly distributed over the time axes. The time intervals between two sensor signals depend on the rotational velocity of the observed wheel. Such type of data which is for example generated by sampling the output from a wheel speed sensor is generally referred to as event domain sampled (here angle domain sampled). Standard signal processing software or hardware products are normally not adapted to event domain sampled data. Fast Fourier Transform (FFT) algorithms for example are in general adapted to time domain data.

Interpolation and Filtering

Some of the embodiments in the previous sections are based on a correlation analysis in the time domain. According to the above section, the wheel speed signals which are originally sampled in the angle domain therefore have to be first transformed to time domain. A standard problem which thereby appears are aliasing effects. The person skilled in the art knows that aliasing effects occur when continuous time signals comprise frequencies above the Nyquist frequency of the applied sampling frequency. Such high frequency components of the signal may be reflected into the signal range of interest by aliasing effects which leads to a deterioration of the signal and the velocity determination performed thereon. The aliasing effects can be avoided by appropriately filtering and interpolating the signal when transforming from angle to time domain. Details about the problem of aliasing effects and respective remedies in the context of angle domain wheel speed signals can be found in the PCT patent application PCT/EP02/12409. Therein disclosed are methods for effectively transforming angle domain wheel speed signals to the time domain without introducing aliasing effects. The disclosure of this patent application shall be incorporated herein by reference since the following embodiments make use of the methods disclosed therein.

The angle domain data sample is obtained by determining the time instances of the successive flank changes in the sensor and storing the obtained time instances in a measurement vector $t_k$. Each time instance corresponds to a constant rotation of the wheel by an angle of $\alpha_k=2\pi/L$ (see above section). The wheel speeds in the time intervals $[t_{k-1},t_k]$ are then approximately given by $$\omega(t_k) = \frac{2\pi}{L(t_k - t_{k-1})} \qquad (12)$$

Manufacturing errors $\epsilon_i$ in the tooth widths of the wheel speed sensor ($\alpha_1=2\pi/L+\epsilon_i$) lead for example to important aliasing effects which have to be compensated for.

As stated above, the wheel speed signal has to be appropriately filtered. To a hypothetical continuous time wheel speed signal, a time continuous anti-alias or band-pass filter $h(t)$ could be applied:

$$\omega^F(t) = \int_0^\infty h(\tau)\omega(t-\tau)d\tau = \int_{-\infty}^0 h(t-\tau)\omega(\tau)d\tau. \qquad (13)$$

In the following embodiments, equation (12) is approximated in one of the implementations listed below (see PCT/EP02/12409 for details):

1. Piece-wise constant $\omega$ and piece-wise constant h:

$$\omega_1^F(t) \approx \sum_{k=-\infty}^m h(t-t_k)\omega(t_k)(t_k - t_{k-1}) \qquad (14)$$

Inserting equation (12) in equation (14) gives $$\omega_1^F(t) \approx \sum_{k=-\infty}^m h(t-t_k)\frac{2\pi}{L} \qquad (14b)$$

2. Piece-wise constant $\omega$ and continuous time h:

$$\omega_2^F(t) \approx \sum_{k=-\infty}^m \omega(t_k)\int_{t_{k-1}}^{t_k} h(t-\tau)d\tau \qquad (15)$$

This sum can be computed from tabulated values of the integral $$H(t) = \int_0^t h(\tau)d\tau$$

of the impulse response.

3. Piece-wise linear $\omega$, with continuous time h:

$$\omega_3^F(t) \approx \sum_{k=-\infty}^m \int_{t_{k-1}}^{t_k} \left(\omega(t_{k-1}) + \frac{\tau - t_{k-1}}{t_k - t_{k-1}}(\omega(t_k) - \omega(t_{k-1}))\right)h(t-\tau)d\tau \qquad (16)$$

Similar to above, this can be computed from tabulated values of the integral of the impulse responses $$H(t) = \int_0^t h(\tau)d\tau \text{ and } H'(t) = \int_0^t \tau h(\tau)d\tau.$$

In principle any polynomial spline function may be defined as approximation for $\omega$.

The filter h may be any appropriate filter function. One embodiment is for example a second order Butterworth filter as used in PCT/EP02/12409.

Implementation

The correlation function of equation (6) contains expectation values which have to be approximated. In one embodiment of the invention, this is done by first high-pass filtering each wheel angular speed signal and then averaging the filtered output signal with an exponential filter:

$$\omega_i^{HP}(t) = H(z)\omega_i^F(t)$$

$$\tilde{R}_{13}(x) = \lambda \tilde{R}_{13}(x) + (1-\lambda)\omega_1^{HP}(t)\omega_3^{HP}(t-x/\omega_1^{LP}(t)). \quad (17)$$

In the first equation, H(z) is an appropriately designed high-pass filter, here expressed in the Z-transform operator z. This high-pass filter should remove low-frequency components in the wheel speed that come from wheel suspension and driver commands. If these components are included, a very strong correlation of all wheel signals will be found for zero lag x=0. On the other hand, a low-pass filtered wheel speed signal, which may be computed as $\omega_1^{LP}(t) = \omega_1^F(t) - \omega_1^{HP}(t) \approx s_1(t)$, approximates the signal part s(t) in (1), and is in (17) used for computing the normalized lag.

In the second equation, $\lambda$ is a forgetting factor (the same as the pole of a first order filter $H(z)=\lambda/(z-\lambda)$) chosen to get the appropriate time constant for tracking a time-varying wheel radius. The forgetting factor can for example be chosen as $\lambda=0.995$. The purpose hereof is to recursively compute an estimate of the correlation function.

Figure 5:
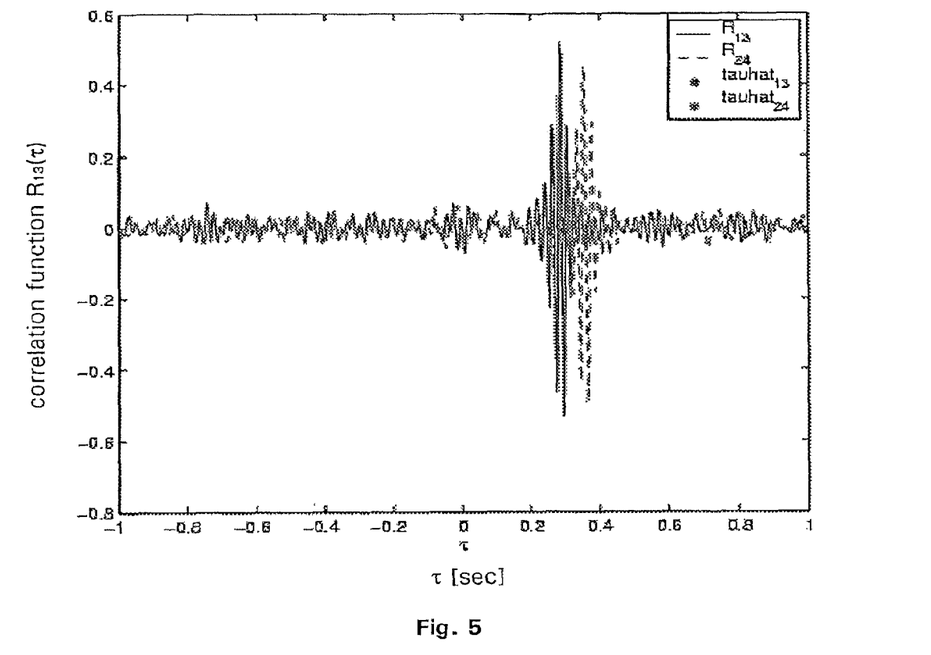
FIG. 5 shows an estimated correlation function of the signals in FIG. 3.
Figure 6A:
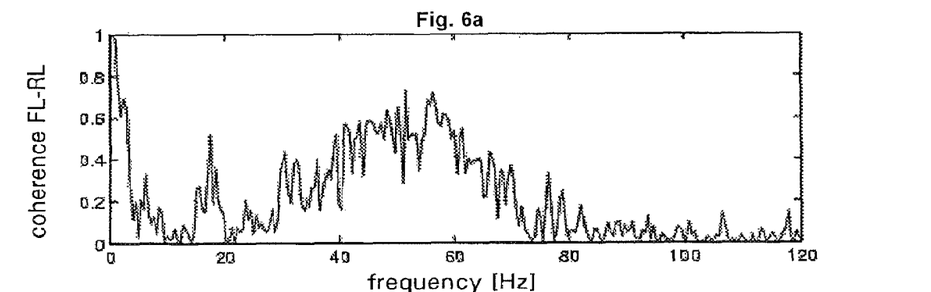
Figure 6B:
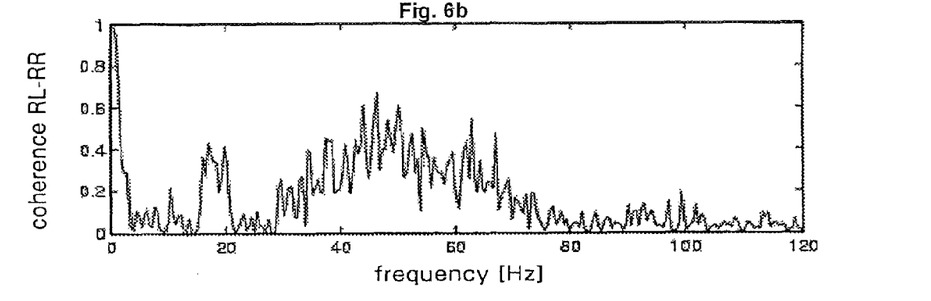

FIG. 5 shows an off-line example of an estimated correlation function using this algorithm. There is a clear peak for a lag of 70 samples, which occurs for $\tau \approx 0.27$. The ringing in the correlation comes from the auto-correlation in the signal itself (the signals s and d in equations (1) and (2)). In comparison thereto, FIG. 7 shows a similar example of an estimated auto-correlation function. As can be seen, the correlation function is mainly a time shifted version of the auto-correlation function, and much higher resolution in $\tau$ can be achieved by a second stage where the auto-correlation is continuously (not using integer shifts) shifted until the best match is achieved.

Further, the filter H(z) in (17) should attenuate all frequencies that do not contribute to the correlation of interest. As can be seen in the coherence function in FIG. 4, the frequencies around 50 Hz seem to be best correlated. That is, H(z) is better chosen as a band-pass filter centered around 50 Hz.

Correlation Analysis in the Angle Domain

Instead of transforming the wheel speed data from the angle domain to the time domain, the following embodiment is based on a direct computation of the correlation in angle domain.

If the covariance $Cov(x,y)=E(xy)-E(x)E(y)$ is correlated, then also $Cov(f(x),g(y))=E(f(x)g(y))-E(f(x))E(g(y))$ is correlated. Now, take $f(x)=g(x)=1/x$. That is, instead of assuming tire correlation in the unit [rad/s], possible correlations are investigated in the inverse unit [s/rad]. Substitution in equation (6) yields the modified correlation function $$\breve{R}_{13}(x) = E\left[\left(\frac{1}{\omega_1(t)} - E\left(\frac{1}{\omega_1(t)}\right)\right)\left(\frac{1}{\omega_3\left(t - \frac{x}{\omega_1}\right)} - \right. \right. \quad (18)$$

$$\left.\left. E\left(\frac{1}{\omega_3\left(t - \frac{x}{\omega_1}\right)}\right)\right)\right]$$

$$= \left(\frac{L}{2\pi}\right)^2 E[((t_k^1 - t_{k-1}^1) - E(t_k^1 - t_{k-1}^1))((t_l^3 - t_{l-1}^3) -$$

$$E(t_l^3 - t_{l-1}^3))], x/\omega_1$$

$$= t_k^1 - t_l^3, l$$

$$= 0, 1, 2, \ldots$$

The approximation follows from (12), where $$\omega_1(t_k) = \frac{2\pi}{L(t_k^1 - t_{k-1}^1)},$$

and the normalized lag x is implicitly defined by $t_l^3$ using the relation $x/\omega_i = t_k^1 - t_l^3$. That is, the integer values of l are used to update the grid points on the x-axis for the correlation function.

Here, $t_m^i$ denotes the time measurement at which the m-th cog of the ABS-sensor passes the sensor in wheel i. The function $R_{13}(x)$ is preferably represented by a table with a fine grid around $x=B/r_3$, and the grid point $x=B/r_3$ is updated which is closest to the value $t_k^1-t_l^3$. An embodiment for an algorithm in which the mean is approximated by the average cog time during the last complete revolution is given by $$\breve{R}_{13}(x) = \lambda \breve{R}_{13}(x) + (1-\lambda)\left(\frac{L}{2\pi}\right)^2 ((t_k^1 - t_{k-1}^1) - (t_{k+L/2-1}^1 - t_{k-L/2}^1)) \times \quad (19)$$

$$((t_l^3 - t_{l-1}^3) - (t_{l+L/2-1}^3 - t_{l-L/2}^3)),$$

$$x/\omega_3 = t_k^1 - t_l^3, l = 0, 1, 2, \ldots$$

Here, $\lambda$ again is a forgetting factor. Determining the maximum of $\breve{R}_{13}$ (x) gives a good approximation of the mean inverse velocity which is insensitive to constant acceleration and wheel imbalance and cog errors. The grid size of the table containing $\omega_1\tau=t_k^1-t_l^3$ should be chosen according to the requirements on resolution in the computed wheel radius $$r_1 = \frac{B}{t_k^1 - t_l^3}. \quad (20)$$

System and Computer Program Product

The embodiments of the computer program products with program code for performing the described methods include any machine-readable medium that is capable of storing or encoding the program code. The term "machine-readable medium" shall accordingly be taken to include, but not to be limited to, solid state memories, optical and magnetic storage media, and carrier wave signals. The program code may be machine code or another code which can be converted into machine code by compilation and/or interpretation, such as source code in a high-level programming language, such as C++, or in any other suitable imperative or functional programming language, or virtual-machine code. The computer program product may comprise a data carrier provided with the program code or other means devised to control or direct a data processing apparatus to perform the method in accordance with the description. A data processing apparatus running the method typically includes a central processing unit, data storage means and an I/O-interface for signals or parameter values.

Thus, a general purpose of the disclosed embodiments is to provide improved methods and products which enable to more accurately determine a vehicle's velocity by means of wheel speed sensors which are in particular already existing within common vehicle electronic systems (antilock braking system and the like).

All publications mentioned in this specification are herein incorporated by reference.

Although certain methods and products constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

The invention claimed is:

1. A method of determining the velocity (v) of a vehicle having at least one pair of a front and a rear wheel which are spaced by a wheel spacing (B), the method comprising for at least one pair of wheels:
    (a) determining front and rear wheel speed signals ($\omega$) indicative of the time dependent behavior of the front and rear wheel speeds, respectively;
    (b) correlating the front and rear wheel speed signals ($\omega$) based on a velocity-compensated correlation function (R) in which a velocity dependency is compensated with the wheel speed signal ($\omega$) of the front or the rear wheel such that a correlation feature remains unchanged with varying vehicle velocity (v) but changes with varying wheel radius (r) of the respective wheel, wherein the correlation feature is indicative of the wheel radius (r) of the respective front wheel or rear wheel, and further wherein the action of correlating is based on the correlation function (R) of the front and rear wheel speed signals, said correlation function (B) is a function of a wheel radius (r), and the correlation feature is the specific wheel radius ($\hat{r}$) which corresponds to the maximum of said correlation function (R); and
    (c) determining the velocity (v) of the vehicle based on said specific wheel radius ($\hat{r}$) and the wheel speed signal ($\omega$) of the respective front and rear wheel.

2. The method of claim 1, wherein said correlation function (R) is a function of the reciprocal ($1/(\omega*r)$) of the product ($\omega*r$) of the known wheel speed signal ($\omega$) and the respective unknown wheel radius (r), and the correlation feature is the specific wheel radius ($\hat{r}$) which corresponds to the maximum of the correlation function (R), whereby the vehicle velocity (v) is computed from the specific wheel radius ($\hat{r}$) and the corresponding wheel speed signal ($\omega$).

3. The method of claim 1, wherein the radii of the front and the rear wheels are determined on the basis of the obtained vehicle velocity (v).

4. The method of claim 3, wherein the wheel radii thus determined are used for tire pressure determination.

5. The method of claim 1, wherein the wheel speed signals ($\omega$) are provided by wheel speed sensors of an antilock braking system (ABS).

6. The method of claim 5, wherein the wheel radii for the front and rear wheels in the at least one pair of wheels thus determined are used for tire pressure determination.

7. The method of claim 1, wherein the velocity thus determined is used for road-friction monitoring.

8. The method of claim 1, wherein the velocity thus determined is used as input for control systems.

9. The method of claim 1, wherein the correlation function (R) reads $$R_{13}(x) = E[(\omega_1(t)))(-\omega_3(t-x/-\omega_1(t))-E(\omega_3(t-x/-\omega_1(t))))]$$

with $x = B/r_1$.

and whereby
B is the spacing between the axles of the front and the rear wheel,
$\omega_1(t)$ is the velocity of the front-left wheel,
$\omega_3(t)$ is the velocity of the rear-left wheel,
$r_1$ is the radius of the front-left wheel, and
E denotes the expectation value.

10. The method of claim 1, wherein an estimation value ($r_1$) for the wheel radius of the front-left wheel is obtained from the equation $r_1 = \arg \max R_{13}(B/r)$ and wherein the vehicle velocity at this wheel is obtained based on this wheel radius estimation value ($r_1$) and the corresponding wheel speed ($\omega_1(t)$).

11. A system for determining the velocity (v) of a vehicle having at least one pair of a front and a rear wheel which are spaced by a wheel spacing (B), the system comprising:
    (a) wheel speed sensors arranged to provide front and rear wheel speed signals ($\omega$) indicative of the time dependent behavior of the front and rear wheel speeds, respectively;
    (b) a correlation unit arranged to correlate the front and rear wheel speed signals ($\omega$) based on a velocity-compensated correlation function (R) in which a velocity dependency is compensated with the wheel speed signal ($\omega$) of the front or the rear wheel such that a correlation feature remains unchanged with varying vehicle velocity (v) but changes with varying wheel radius (r) of the respective wheel, wherein the correlation feature is indicative of the wheel radius (r) of the respective front wheel or rear wheel, and further wherein the action of correlating is based on the correlation function (R) of the front and rear wheel speed signals, said correlation function (R) is a function of a wheel radius (r), and the correlation feature is the specific wheel radius ($\hat{r}$) which corresponds to the maximum of said correlation function (R); and
    (c) a determination unit arranged to determine the velocity (v) of the vehicle based on said specific wheel radius ($\hat{r}$) and the wheel speed signal ($\omega$) of the respective front and rear wheel.

12. A computer program product embodied on a tangible machine readable medium including program code for carrying out a method, when executed on a processing system, of determining the velocity (v) of a vehicle having at least one pair of a front and a rear wheel which are spaced by a wheel spacing (B), the program code being arranged to:
    (a) determine front and rear wheel speed signals ($\omega$) indicative of the time dependent behavior of the front and rear wheel speeds, respectively;
    (b) correlate the front and rear wheel speed signals ($\omega$) based on a velocity-compensated correlation function (R) in which a velocity dependency is compensated with the wheel speed signal ($\omega$) of the front or the rear wheel such that a correlation feature remains unchanged with varying vehicle velocity (v) but changes with varying wheel radius (r) of the respective wheel, wherein the correlation feature is indicative of the wheel radius (r) of the respective front wheel or rear wheel and further, wherein the action of correlating is based on the correlation function (R) of the front and rear wheel speed signals, said correlation function (R) is a function of a wheel radius (r) and the correlation feature is the specific wheel radius ($\hat{r}$) which corresponds to the maximum of said correlation function (R); and (c) determine the velocity (v) of the vehicle based on said specific wheel radius ($\hat{r}$) and the wheel speed signal ($\omega$) of the respective front or rear wheel.

13. A system for determining the velocity (v) of a vehicle having at least one pair of a front and a rear wheel which are spaced by a wheel spacing (B) the system comprising:

(a) wheel speed sensors arranged to provide front and rear wheel speed signals ($\omega$) indicative of the time dependent behavior of the front and rear wheel speeds, respectively;

(b) a correlation unit arranged to correlate the front and rear wheel speed signals ($\omega$) in order to determine a specific correlation feature indicative of the time delay ($\tau$) between the front and rear wheel speed signals, wherein the correlation feature is obtained by Fourier transforming the wheel speed signals ($\omega$) to obtain Fourier transformed wheel speed signals ($\Omega$) and calculating a phase function (arg ($\Omega_1(f)/\Omega_3(f)$)) of the ratio of the Fourier transformed wheel speed signals ($\Omega$) of the front and the rear wheel, wherein the slope of said phase function is the correlation feature indicative of the time delay ($\tau$) and arranged to determine the velocity (v) of the vehicle based on the indicated time delay ($\tau$) and the wheel speed signal ($\omega$) of the respective front or rear wheel.

14. A computer program product on a tangible machine readable medium including program code for carrying out a method, when executed on a processing system, of determining the velocity (v) of a vehicle having at least one pair of a front and a rear wheel which are spaced by a wheel spacing (B), the program code being arranged to:

(a) determine front and rear wheel speed signals ($\omega$) indicative of the time dependent behavior of the front and rear wheel speeds, respectively;

(b) correlate the front and rear wheel speed signals ($\omega$) in order to determine a specific correlation feature indicative of the time delay ($\tau$) between the front wheel and rear wheel speed signals, wherein the action of correlating is based on a correlation function (R) of the front and rear wheel speed signals, and further wherein the correlation feature is obtained by aa) Fourier transforming the wheel speed signals ($\omega$) to obtain Fourier transformed wheel speed signals ($\Omega$);

bb) calculating a phase function (arg ($\Omega_1(f)/\Omega_3(f)$)) of the ratio of the Fourier transformed wheel speed signals ($\Omega$) of the front and the rear wheel, wherein the slope of said phase function is the correlation feature indicative of the time delay ($\tau$); and (c) determine the velocity (v) of the vehicle based on the indicated time delay ($\tau$) and the wheel spacing (B).

15. A method of determining the velocity (v) of a vehicle having at least one pair of front and rear wheels which are spaced by a wheel spacing (B), the method comprising for at least one pair of wheels:

(a) determining front and rear wheel speed signals ($\omega$) indicative of the time dependent behavior of the front and rear wheel speeds, respectively;

(b) correlating the front and rear wheel speed signals ($\omega$) in order to determine a specific correlation feature indicative of the time delay ($\tau$) between the front wheel and rear wheel speed signals, wherein the action of correlating is based on a correlation function (R) of the front and rear wheel speed signals, and further, wherein the correlation feature is obtained by aa) Fourier transforming the wheel speed signals ($\omega$) to obtain Fourier transformed wheel speed signals ($\Omega$);

bb) calculating a phase function (arg($\Omega_1(f)/\Omega_3(f)$)) of the ratio of the Fourier transformed wheel speed signals ($\Omega$) of the front and the rear wheel, wherein the slope of said phase function is the correlation feature indicative of the time delay ($\tau$);

(c) determining the velocity (v) of the vehicle based on the indicated time delay ($\tau$) and the wheel spacing (B).

16. The method of claim 15, wherein the front and rear wheel speed signals ($\omega$) are transformed from angle domain to time domain by interpolation without aliasing effects.

17. The method of claim 15, wherein the action of correlating is based on the reciprocals of the wheel speed signals ($1/\omega$) to perform to action of correlating within to angle domain.

* * * * *